(12) United States Patent
Zhang et al.

(10) Patent No.: US 11,860,008 B2
(45) Date of Patent: Jan. 2, 2024

(54) SELF-HETERODYNE φ-OTDR SYSTEM WITH FREE MULTI-SPATIAL RESOLUTION

(71) Applicant: NANJING UNIVERSITY, Nanjing (CN)

(72) Inventors: Yixin Zhang, Nanjing (CN); Jinyu Song, Nanjing (CN); Xuping Zhang, Nanjing (CN); Zhewen Ding, Nanjing (CN); Shuai Tong, Nanjing (CN); Shun Wang, Nanjing (CN); Feng Wang, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 0 days.

(21) Appl. No.: 17/920,809

(22) PCT Filed: May 6, 2022

(86) PCT No.: PCT/CN2022/091057
§ 371 (c)(1),
(2) Date: Oct. 24, 2022

(87) PCT Pub. No.: WO2022/267704
PCT Pub. Date: Dec. 29, 2022

(65) Prior Publication Data
US 2023/0314188 A1    Oct. 5, 2023

(30) Foreign Application Priority Data

Jun. 21, 2021 (CN) .......................... 202110685702.8

(51) Int. Cl.
*G01D 5/353* (2006.01)

(52) U.S. Cl.
CPC ................ *G01D 5/35358* (2013.01)

(58) Field of Classification Search
CPC .................. G01D 5/35358; G01D 5/35361
See application file for complete search history.

(56) References Cited

U.S. PATENT DOCUMENTS

| 2013/0113629 | A1 | 5/2013 | Hartog et al. |
| 2019/0226885 | A1 | 7/2019 | Rowen et al. |
| 2021/0140814 | A1* | 5/2021 | Aktas ................ G01H 9/00 |

FOREIGN PATENT DOCUMENTS

| CN | 103954348 A | 7/2014 |
| CN | 107976248 A | 5/2018 |

(Continued)

*Primary Examiner* — Thanh Luu
(74) *Attorney, Agent, or Firm* — Bayramoglu Law Offices LLC (57) ABSTRACT

A self-heterodyne phase-sensitive optical time domain reflectometry (φ-OTDR) system with a free multi-spatial resolution includes a narrow linewidth laser source, a 1×3 fiber-optic coupler, three acousto-optic modulators (AGMs), a 3×1 fiber-optic coupler, two time-delay fibers, an erbium-doped fiber amplifier (EDFA), a circulator, a photodetector, an electrical amplifier, three filters, a data acquisition card, a pulse signal generator, and a driver module. A plurality of acousto-optic modulators using the same driver are used to couple probe light with different pulse intervals and different frequency shifts and then inject the probe light into a fiber, such that a self-heterodyne detection structure with a multi-spatial resolution is implemented, which suppressed optical background noise such as coherent fading noise, phase noise introduced by a frequency drift of a light source, and pseudo-random noise (PRN).

9 Claims, 6 Drawing Sheets

(56) References Cited

FOREIGN PATENT DOCUMENTS

| | | |
|---|---|---|
| CN | 109186739 A | 1/2019 |
| CN | 109459126 A | 3/2019 |
| CN | 110108346 A | 8/2019 |
| CN | 112504629 A | 3/2021 |
| CN | 112833929 A | 5/2021 |
| CN | 113418539 A | 9/2021 |
| WO | 2017203271 A1 | 11/2017 |

* cited by examiner

SELF-HETERODYNE φ-OTDR SYSTEM WITH FREE MULTI-SPATIAL RESOLUTION

CROSS REFERENCES TO THE RELATED APPLICATIONS

The application is the national phase entry of International Application No. PCT/CN2022/091057, filed on May 6, 2022, which is based on and claims priority on Chinese patent application No. 202110685702.8, filed on Jun. 21, 2021, the entire contents of which are incorporated herein by reference.

TECHNICAL FIELD

The present disclosure relates to the field of distributed optical fiber sensing technologies and, in particular, to a self-heterodyne phase-sensitive optical time domain reflectometry (φ-OTDR) system with a free multi-spatial resolution.

BACKGROUND

A distributed optical fiber sensor (DOFS) uses an entire fiber as a sensing medium and a sensing unit of a signal and can continuously measure a parameter change along the fiber in real-time. With advantages such as anti-electromagnetic interference, high sensitivity, and high-temperature and high-pressure resistance, the DOFS is very suitable for structural health monitoring of large infrastructure with a wide range and a long distance and is increasingly widely used in infrastructure and fields, such as power cables, tunnels, oil and gas pipelines, and perimeter security.

Currently, a φ-OTDR is the most developed and widely used distributed optical fiber sensing technology based on Rayleigh backscattering (RBS), which utilizes a coherent fading effect between RBS for sensing measurement. However, affected by actual complex environmental factors, there are still many problems in the design and application of sensing devices based on RBS, and therefore, it is difficult to meet the requirements of all application scenarios.

Patent No. CN112504629A provides a light scattering parameter measurement system and a measurement method thereof. In the method, a dual-frequency scattering interference technology is used to implement distributed measurement on a Rayleigh scattering parameter in a fiber. Based on the dual-frequency interference technology, a Rayleigh scattering ratio r and a Rayleigh scattering additional phase θ are modulated onto different components of an interference signal through interference modulation to decouple the two through simple filtering, thereby implementing separate measurements of the two. A linear stretch is applied to a to-be-detected fiber, such that uniform phase change signals are added to all positions, and an item including only the Rayleigh scattering rate r can be separately extracted through low-pass filtering. The pulse width and sampling rate of an acquisition card are purposely selected, such that the pulse width is twice the thickness of a sheet, thereby simplifying the calculation formula. In this way, a new distributed temperature and strain sensor can be realized. In this invention, direct measurement of the Rayleigh scattering parameter is of great significance to a series of basic and applied research fields related to the Rayleigh scattering of the fiber.

However, both positions and reflectivity of Rayleigh scattering points are random, and phases and amplitudes of RBS are also randomly distributed. Therefore, a coherent fading effect occurs during the superposition of RBS, thus resulting in a detection dead zone and reducing the detection performance of a sensing system. In addition, optical background noise such as phase noise and pseudo-random noise (PRN) is introduced to the system due to the frequency drift of a laser and a polarization state of the reference light, thereby reducing the signal-to-noise ratio (SNR) of the sensing system and limiting the application of a distributed optical fiber vibration sensor. Second, spatial resolution is an important indicator of a distributed optical fiber vibration sensing system. However, the affected length of a vibration signal cannot be predicted in advance in practical application, and a too-low or too-high spatial resolution reduces the SNR of the system and affects the overall performance of the sensing device. Therefore, to obtain better sensing performance and make it more suitable for practical application, the most proper spatial resolution needs to be selected according to a characteristic of a vibration event in practical application to obtain the optimal system performance.

SUMMARY

To overcome disadvantages in the prior art, the present disclosure provides a self-heterodyne φ-OTDR system with a free multi-spatial resolution. In the system, a plurality of acousto-optic modulators (AOMs) using the same driver are used to couple probe light with different pulse intervals and different frequency shifts and then inject the probe light into a fiber, such that a self-heterodyne detection structure with a multi-spatial resolution is implemented. In this way, optical background noise such as coherent fading noise, phase noise introduced by a frequency drift of a light source, and PRN can be effectively suppressed, and the problem of spatial resolution matching can be resolved.

To achieve the foregoing objective, the following technical solutions are used in the present disclosure:

According to a first aspect, an embodiment of the present disclosure provides a self-heterodyne φ-OTDR system with a free multi-spatial resolution. The φ-OTDR system includes a narrow linewidth laser source, a 1×3 fiber-optic coupler, three AOMs, a 3×1 fiber-optic coupler, two time-delay fibers, an erbium-doped fiber amplifier (EDFA), a circulator, a photodetector, an electrical amplifier, three filters, a data acquisition card, a pulse signal generator, and a driver module.

The narrow linewidth laser source is configured to generate a continuous laser with a high coherence characteristic and inject the continuous laser into a fiber.

The 1×3 fiber-optic coupler is provided with an input terminal connected to the narrow linewidth laser source through an isolator and three output terminals respectively connected to the three AOMs. The 1×3 fiber-optic coupler is configured to divide the continuous laser generated by the narrow linewidth laser source into three paths of light with equal powers, such that the three paths of light are modulated by the three AOMs into probe light with different frequency shifts.

The 3×1 fiber-optic coupler is provided with two input terminals respectively connected to the output terminals of two of the AOMs through the two time-delay fibers, another input terminal directly connected to an output terminal of the remaining AOM, and an output terminal connected to an input terminal of the circulator through the EDFA. The three paths of probe light are coupled into the EDFA through the 3×1 fiber-optic coupler for amplification and then enter the circulator, and one output terminal of the circulator is connected to the photodetector and the other output terminal is connected to a to-be-detected fiber.

The photodetector is connected to the three filters with different center frequencies through the electrical amplifier, and the photodetector is configured to convert one path of an optical signal output by the circulator into an electrical signal, which is amplified by the electrical amplifier and then enters the three filters for bandpass filtering to generate three groups of intermediate frequency signals. The difference between the arm lengths of the two time-delay fibers is controlled such that two of the three groups of obtained intermediate frequency signals have the same spatial resolution, and another group has a different spatial resolution from the other two groups. The spatial resolution is determined by a pulse interval and a pulse width of an intermediate frequency signal.

The data acquisition card is connected to the driver module through the pulse signal generator, and an output terminal of the driver module is simultaneously connected to the three AOMs. The data acquisition card is configured to sample the three groups of intermediate frequency signals to obtain original signals. The pulse signal generator generates a corresponding modulation signal according to the original signals obtained through sampling and sends the modulation signal to the driver module, such that the driver module simultaneously controls the three AOMs to generate corresponding pulse probe light.

Further, in the φ-OTDR system, the two groups of intermediate frequency signals with the same spatial resolution are used to avoid a coherent fading area based on an optimization algorithm through frequency division multiplexing to restore the original signals.

Further, in the φ-OTDR system, one spatial resolution in two groups of different spatial resolutions is selected as an optimal resolution for detection according to an event length of the vibration signal.

In comparison with an affected length of the external disturbance on the fiber, when the selected spatial resolution is equal to an affected length of a to-be-detected event, a SNR of the φ-OTDR system is optimal.

Further, the photodetector employs a PIN+EDFA structure.

Further, the data acquisition card is synchronously controlled by a pulse signal of the pulse signal generator.

According to a second aspect, an embodiment of the present disclosure provides a working method of the self-heterodyne φ-OTDR system with a free multi-spatial resolution, where the working method includes:

S1. Driving the narrow linewidth laser source to output a continuous laser signal with a high coherence characteristic at constant power and injecting the generated continuous laser signal into a subsequent fiber through the isolator;

S2. Dividing the continuous laser signal into three paths of optical signals with equal powers by using the 1×3 fiber-optic coupler;

S3. Driving the driver module to synchronously control the three AOMs by using the pulse signal generator to modulate the three paths of optical signals into three paths of pulse light with different frequency shifts;

S4. Enabling the three paths of pulse light to pass through the time-delay fibers with different lengths to introduce different pulse intervals, then coupling the three paths of pulse light into the EDFA through the 3×1 fiber-optic coupler for amplification, and injecting amplified and coupled optical signals into the to-be-detected fiber through the circulator;

S5. Inducing a part of the optical signals including vibration information through the circulator, converting the part of optical signals into a corresponding electrical signal by using the photodetector, and dividing the electrical signal into three paths of electrical signals through the electrical amplifier;

S6. Performing the filtering processing on the three paths of electrical signals by using bandwidth filters with different center frequencies and filtering out a noise signal and a high-frequency signal included in the three paths of electrical signals to obtain three paths of intermediate frequency signals with different frequencies; and S7. Sampling the intermediate frequency signals by using the data acquisition card to obtain an original signal and adjusting the pulse signal generator based on the original signal, where the pulse signal generator and the data acquisition card work synchronously.

Further, the working method includes:

applying a to-be-detected vibration event on the to-be-detected fiber and simultaneously demodulating raw data corresponding to the three groups of intermediate frequency signals, where two groups of intermediate frequency signals have the same spatial resolution and another group has a different spatial resolution than the other two groups; and avoiding a coherent fading area based on the two groups of intermediate frequency signals with the same spatial resolution and selecting one spatial resolution in two groups of different spatial resolutions according to an event length of a vibration signal as an optimal resolution for detection to restore the original signals.

The beneficial effects of the present disclosure are as follows:

(1) The three AOMs share one driver. Therefore, the initial phases of three pulses modulated by the AOMs are the same, thereby eliminating phase noise introduced between the three pulses due to the frequency drift of a light source.

(2) The difference between the arm lengths of the time-delay fibers is controlled such that two of the three groups of obtained intermediate frequency signals have the same spatial resolution. The two groups of intermediate frequency signals are used to avoid the coherent fading area based on the optimization algorithm through frequency division multiplexing, thereby suppressing coherent fading noise.

(3) The difference between the arm lengths of the time-delay fibers is controlled such that one of the three groups of intermediate frequency signals have a different spatial resolution from the other two groups, and therefore, the system can provide two spatial resolution capabilities. A proper spatial resolution can be selected according to a wavelength of a monitored vibration to obtain higher sensitivity, thereby implementing the detection of an optimal resolution on vibration signals of different event lengths in the same optical path. In addition, the optimal spatial resolution can be automatically selected without manual adjustment.

DETAILED DESCRIPTION OF THE EMBODIMENTS

The present disclosure is further described in detail with reference to the accompanying drawings.

It should be noted that terms such as "up", "down", "left", "right", "front", and "back" that are referenced in the present disclosure are used for ease of description and are not intended to limit the implementation scope of the present disclosure. A change or an adjustment to a relative relationship thereof also falls within the scope of the present disclosure without a substantial change of technical content.

Figure 1:
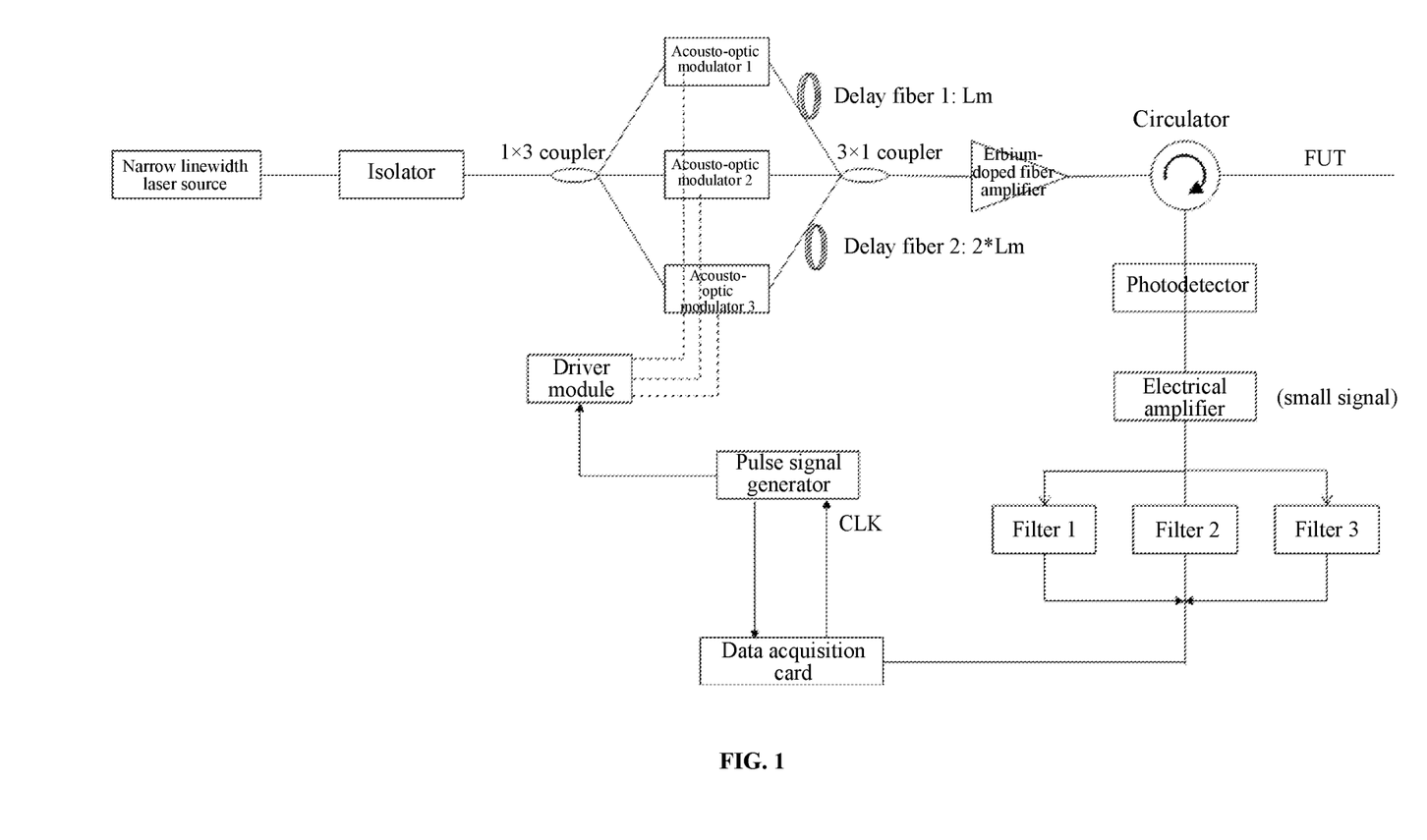
FIG. 1 is a schematic structural diagram of a self-heterodyne φ-OTDR system with a free multi-spatial resolution according to an embodiment of the present disclosure.
Figure 2A:
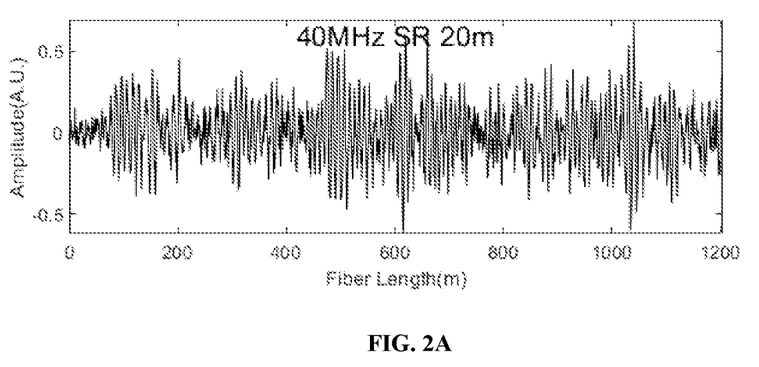
FIG. 2A is a spatial domain diagram of an intermediate frequency signal obtained by a bandwidth filter with a center frequency of 40 MHz.
Figure 2B:
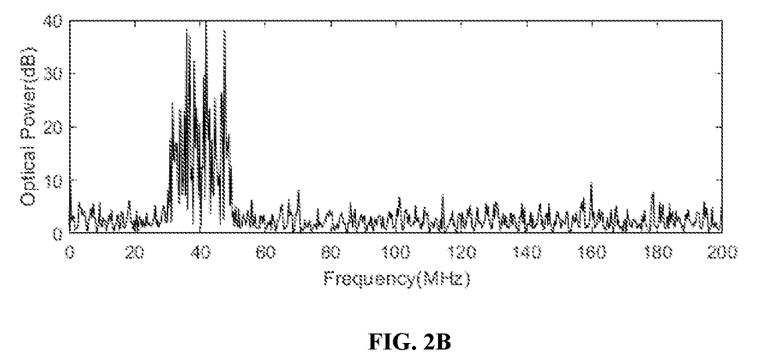
FIG. 2B is a frequency domain diagram of an intermediate frequency signal obtained by a bandwidth filter with a center frequency of 40 MHz.
Figure 2C:
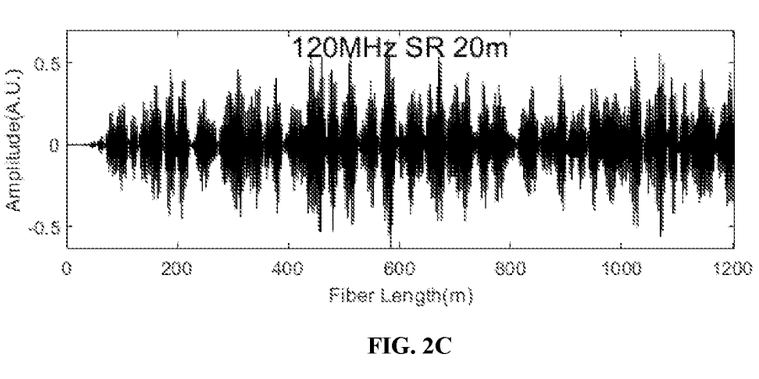
FIG. 2C is a spatial domain diagram of an intermediate frequency signal obtained by a bandwidth filter with a center frequency of 120 MHz.
Figure 2D:
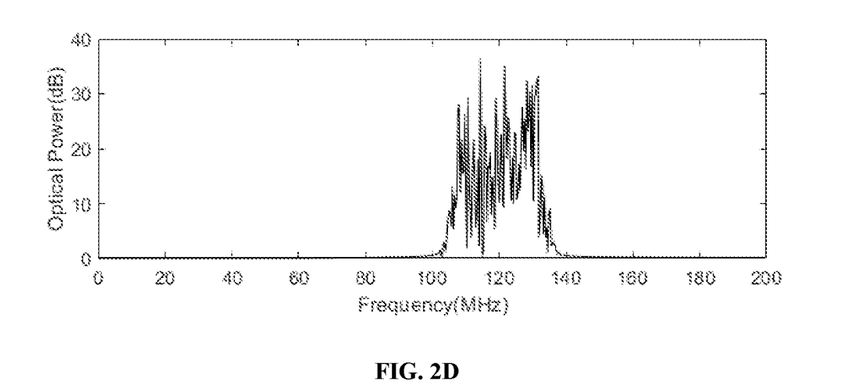
FIG. 2D is a frequency domain diagram of an intermediate frequency signal obtained by a bandwidth filter with a center frequency of 120 MHz.
Figure 2E:
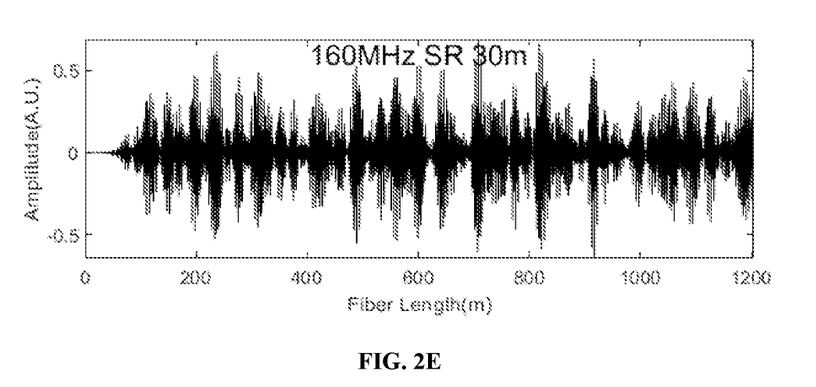
FIG. 2E is a spatial domain diagram of an intermediate frequency signal obtained by a bandwidth filter with a center frequency of 160 MHz.
Figure 2F:
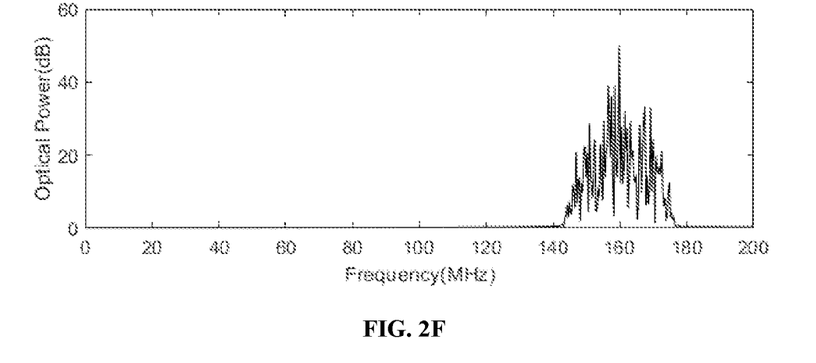
FIG. 2F is a frequency domain diagram of an intermediate frequency signal obtained by a bandwidth filter with a center frequency of 160 MHz.

FIG. 1 is a schematic structural diagram of a self-heterodyne φ-OTDR system with a free multi-spatial resolution according to an embodiment of the present disclosure. Referring to FIG. 1, the φ-OTDR system includes a narrow linewidth laser source (NLL), an isolator (Isolator), a 1×3 fiber-optic coupler, three AOMs (AOM), a 3×1 fiber-optic coupler, two time-delay fibers (Fiber), an EDFA, a circulator, a photodetector, an electrical amplifier, three filters (Filter), a data acquisition card (DAQ), a pulse signal generator (AWG), and a driver module (Driver).

The narrow linewidth laser source is configured to generate a specific wavelength continuous laser with a high coherence characteristic and inject the continuous laser into a fiber.

The 1×3 fiber-optic coupler is provided with an input terminal connected to the narrow linewidth laser source through the isolator, and the isolator is configured to prevent reverse transmission of light in the fiber into a light source. Three output terminals of the 1×3 fiber-optic coupler are respectively connected to the three AOMs, and the 1×3 fiber-optic coupler is configured to divide the continuous laser generated by the narrow linewidth laser source into three paths of light with equal powers, such that the three paths of light are modulated by the three AOMs into probe light with different frequency shifts. The pulse signal generator is connected to the driver module, and an output terminal of the driver module is simultaneously connected to the three AOMs. The three AOMs share one driver. Therefore, the initial phases of three pulses modulated by the AOMs are the same, thereby eliminating phase noise introduced between the three pulses due to the frequency drift of a light source.

The 3×1 fiber-optic coupler is provided with two input terminals respectively connected to the output terminals of two of the AOMs through the two time-delay fibers, another input terminal directly connected to an output terminal of the remaining AOM, and an output terminal connected to an input terminal of the circulator through the EDFA. The three paths of probe light are coupled into the EDFA through the 3×1 fiber-optic coupler for amplification and then enter the circulator, and one output terminal of the circulator is connected to the photodetector and the other output terminal is connected to a to-be-detected fiber.

The photodetector is connected to the three filters with different center frequencies through the electrical amplifier, and the photodetector is configured to convert one path of an optical signal output by the circulator into an electrical signal, which is amplified by the electrical amplifier and then enters the three filters for bandpass filtering to generate three groups of intermediate frequency signals. The difference between the arm lengths of the two time-delay fibers is controlled such that two of the three groups of obtained intermediate frequency signals have the same spatial resolution, and the other group has a different spatial resolution from the other two groups. The spatial resolution is determined by a pulse interval and a pulse width of an intermediate frequency signal.

The data acquisition card is connected to the driver module through the pulse signal generator, and an output terminal of the driver module is simultaneously connected to the three AOMs. The data acquisition card is configured to sample the three groups of intermediate frequency signals to obtain an original signal, and the pulse signal generator generates a corresponding modulation signal according to the original signal obtained through sampling and sends the modulation signal to the driver module, such that the driver module simultaneously controls the three AOMs to generate corresponding pulse probe light.

Based on the foregoing system structure, an embodiment of the present disclosure provides a working method of the self-heterodyne φ-OTDR system with a free multi-spatial resolution. The working method includes the following steps:

S1. The narrow linewidth laser source is driven to output a continuous laser signal with a high coherence characteristic at constant power, and the generated continuous laser signal is injected into a subsequent fiber through the isolator.

S2. The continuous laser signal is divided into three paths of optical signals with equal powers by using the 1×3 fiber-optic coupler.

S3. The driver module is driven by the pulse signal generator to synchronously control the three AOMs to modulate the three paths of optical signals into three paths of pulse light with different frequency shifts.

S4. The three paths of pulse light can pass through the time-delay fibers with different lengths to introduce different pulse intervals. Then the three paths of pulse light are coupled into the EDFA through the 3×1 fiber-optic coupler for amplification. Amplified and coupled optical signals are injected into the to-be-detected fiber through the circulator.

S5. A part of optical signals including vibration information is induced through the circulator. That part of the optical signals is converted into a corresponding electrical signal by using the photodetector, and the electrical signal is divided into three paths of electrical signals through the electrical amplifier.

S6. Filtering processing is performed on the three paths of electrical signals by using bandwidth filters with different center frequencies. A noise signal and a high-frequency signal included in the three paths of electrical signals are filtered out to obtain three paths of intermediate frequency signals with different frequencies.

S7. The intermediate frequency signals are sampled using the data acquisition card to obtain an original signal. The pulse signal generator is adjusted based on the original signal, where the pulse signal generator and the data acquisition card work synchronously.

The foregoing working principle of the φ-OTDR system is described in detail below by using a specific example.

An optical wavelength output by the NTK narrow linewidth laser source used in this embodiment is 1550 nm, a linewidth is 200 HZ, and an optical power is 10 dBm. The three AOMs all have a radio frequency power of 2.5 W and work on corresponding frequency shift frequencies. The frequency shifts of the three AOMs are 40 MHz, 80 MHz, and 200 MHz, respectively. The pulse signal generator is a function generator. It is assumed that the repetition frequency of the AOM adjusted by the function generator (the pulse signal generator) is 1 kHz and the pulse width is 100 ns. The photodetector employs a PIN+EDFA structure. The center frequencies of the three bandwidth filters are 40 MHz, 120 MHz, and 160 MHz, respectively. It should be understood that the foregoing specific parameters are merely used as an example for description. In practical work, different parameters may be set according to an actual requirement.

Specific working steps of the φ-OTDR system are as follows:

Step 1: The narrow linewidth laser source outputs light with a constant power of 10 dBm and a center wavelength of 1550 nm, and the light is injected into a fiber through the isolator. The isolator herein is configured to prevent reverse transmission of light in the fiber into a light source.

Step 2: After passing through the 1×3 fiber-optic coupler, an optical signal in the fiber is divided into three paths of light with equal powers.

Step 3: The function generator outputs a modulation signal with a repetition frequency of 1 kHz and a pulse width of 100 ns, controls the three AOMs by using the driver module, and modulates the three paths of light into pulse light whose frequency shifts are respectively 40 MHz, 80 MHz, and 200 MHz Step 4: The three paths of light pass through the time-delay fibers with different lengths (for example, one is L m, and the other is 2 L m). The induced pulse intervals are respectively 100 ns and 200 ns. The three paths of light are coupled into a subsequent fiber through the 3×1 fiber-optic coupler and then injected into the to-be-detected fiber through the EDFA.

Step 5: An optical signal led out by the circulator is converted into an electrical signal through the photodetector, and then the electrical signal is divided into three paths of signals through the electrical amplifier.

Step 6: The three paths of electrical signals pass through the bandwidth filters whose central frequencies are respectively 40 MHz, 120 MHz, and 160 MHz Noise and a high-frequency signal are filtered out to obtain intermediate frequency signals of corresponding frequencies, as shown in FIG. 2A to FIG. 2F.

Step 7: The intermediate frequency signals are acquired by the data acquisition card to obtain an original signal, subsequent signal processing is performed at a computer side, and the function signal generator is adjusted according to a result, such that the system works stably. The data acquisition card is controlled synchronously by a pulse signal of 1 kHz of the function generator.

In this multi-pulse self-heterodyne structure, the resolution of the system is determined by a pulse interval and a pulse width. According to the specific parameters in the foregoing steps, spatial resolutions corresponding to pulse light with different frequency shifts are respectively 20 m, 20 m, and 30 m, such that two groups have the same spatial resolution and one group has another spatial resolution in the design of the system.

Figure 3A:
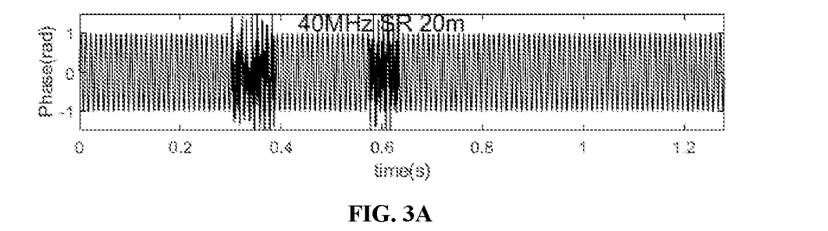
FIG. 3A is a schematic diagram of an original signal obtained by demodulating an intermediate frequency signal of 40 MHz.
Figure 3B:
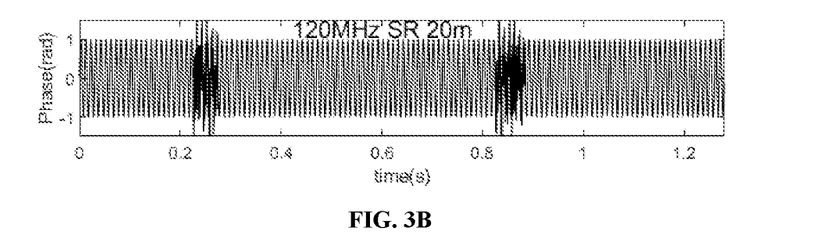
FIG. 3B is a schematic diagram of an original signal obtained by demodulating an intermediate frequency signal of 120 MHz.
Figure 3C:
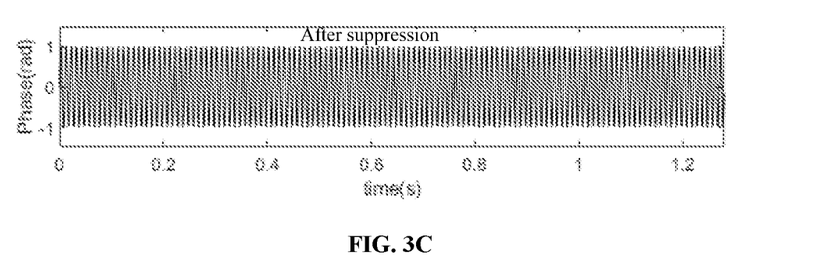
FIG. 3C is a schematic diagram of a final demodulation result of a to-be-detected vibration event.

A monophonic vibration signal of 100 Hz is applied to the to-be-detected fiber under external disturbance, and a schematic diagram of the result obtained after the original signal is demodulated at a computer side is shown in FIG. 3C. In FIG. 3A and FIG. 3B, the demodulation results of two intermediate frequency signals with the same spatial resolution are compared. It can be learned that in the detection area, original signals obtained by demodulating an intermediate frequency signal of 40 MHz and an intermediate frequency signal of 120 MHz have distortion caused by coherent fading in different positions. The original signal corresponding to the intermediate frequency signal of 40 MHz has distortion in an area between 0.3s and 0.4s and an area near 0.6s. The original signal corresponding to the intermediate frequency signal of 120 MHz has distortion in an area between 0.2s and and an area between 0.8s and 0.85s. The distortion areas of the two original signals are just staggered. Therefore, during restoration, the original signals can be better restored by actively avoiding these positions with distortion by using an optimization algorithm to suppress coherent fading noise.

Figure 4:
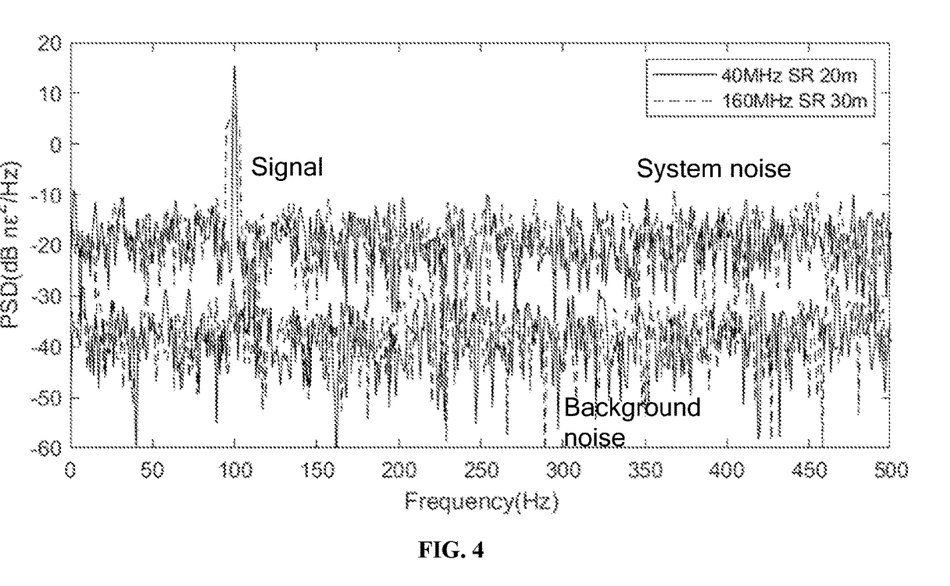
FIG. 4 is a frequency domain diagram of a vibration signal restored at different spatial resolutions.

An affected length of the external disturbance on the to-be-detected fiber is set to m. The original signals may be demodulated at the computer side to obtain original vibration signals restored at different spatial resolutions. By means of frequency domain transformation, SNRs of vibration signals at different spatial resolutions can be obtained, and a schematic result diagram is shown in FIG. 4. It can be learned from the figure that a difference between system noise and background noise is about 20 dB. In addition, at 100 Hz of a to-be-detected signal, signal strength obtained by demodulating an intermediate frequency signal of 40 MHz whose spatial resolution is 20 m is about 15.4 dB and a SNR is 55.4 dB, and signal strength obtained by demodulating an intermediate frequency signal of 160 MHz whose spatial resolution is 30 m is about 5.4 dB and a SNR is 45.4 dB. In comparison with the affected length of the external disturbance on the fiber, when the spatial resolution is equal to an affected length of a to-be-detected event, a SNR of the system is optimal.

Figure 5:
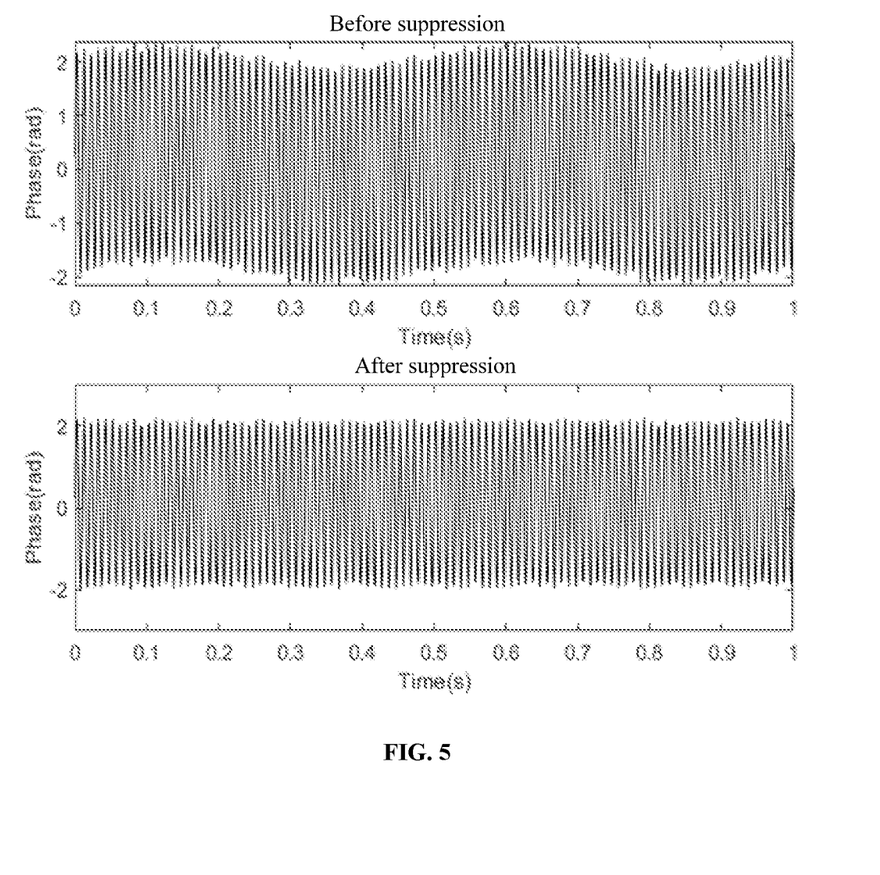
FIG. 5 is a schematic effect diagram of suppressing phase noise caused by a frequency drift of a light source.

In addition, a beneficial effect of sharing the same driver by the AOMs is shown in FIG. 5. In this way, phase noise between three probe pulses caused by a frequency drift of a light source can be effectively suppressed.

The foregoing are merely preferred implementations of the present disclosure, and the protection scope of the present disclosure is not limited to the foregoing embodiments. Any technical solution under the ideas of the present disclosure falls within the protection scope of the present disclosure. It should be noted that improvements and modifications made by a person of ordinary skill in the art without departing from the principle of the present disclosure shall fall within the protection scope of the present disclosure.

What is claimed is:

1. A self-heterodyne phase-sensitive optical time domain reflectometry (φ-OTDR) system with a free multi-spatial resolution, wherein the φ-OTDR system comprises a narrow linewidth laser source, a 1×3 fiber-optic coupler, three acousto-optic modulators (AGMs), a 3×1 fiber-optic coupler, two time-delay fibers, an erbium-doped fiber amplifier (EDFA), a circulator, a photodetector, an electrical amplifier, three filters, a data acquisition card, a pulse signal generator, and a driver module, wherein the narrow linewidth laser source is configured to generate a continuous laser with a high coherence characteristic and inject the continuous laser into a fiber;

the 1×3 fiber-optic coupler is provided with an input terminal connected to the narrow linewidth laser source through an isolator and three output terminals respectively connected to the three AOMs, and the 1×3 fiber-optic coupler is configured to divide the continuous laser generated by the narrow linewidth laser source into three paths of light with equal powers, and the three paths of light are modulated by the three AOMs into three paths of probe light with different frequency shifts;

the 3×1 fiber-optic coupler comprises first to third input terminals, the three AOMs are first to third AOMs, wherein the first input terminal and the second input terminal are respectively connected to output terminals of the first and second AOMs through the two time-delay fibers, the third input terminal is directly connected to an output terminal of the third AOM, and the 3×1 fiber-optic coupler further comprises an output terminal connected to an input terminal of the circulator through the EDFA; the three paths of probe light are coupled into the EDFA through the 3×1 fiber-optic coupler for amplification and then enters the circulator; and a first output terminal of the circulator is connected to the photodetector and a second output terminal of the circulator is connected to a to-be-detected fiber;

the photodetector is connected to the three filters with different center frequencies through the electrical amplifier, and the photodetector is configured to convert one path of an optical signal output by the circulator into an electrical signal, wherein the electrical signal is amplified by the electrical amplifier and then enters the three filters for bandpass filtering for generating first to third groups of intermediate frequency signals; a difference between arm lengths of the two time-delay fibers is controlled to enable the first and second groups of intermediate frequency signals to have a same spatial resolution, and the third group of intermediate frequency signals to have a different spatial resolution from the first and second groups of intermediate frequency signals; and a spatial resolution is determined by a pulse interval and a pulse width of an intermediate frequency signal;

the data acquisition card is connected to the driver module through the pulse signal generator, and an output terminal of the driver module is simultaneously connected to the three AOMs; and the data acquisition card is configured to sample the three groups of intermediate frequency signals to obtain original signals, and the pulse signal generator generates a corresponding modulation signal according to the original signals obtained through sampling and sends the modulation signal to the driver module, and the driver module simultaneously controls the three AOMs to generate a corresponding pulse probe light;

in the φ-OTDR system, the first and second groups of intermediate frequency signals with the same spatial resolution are used to avoid a coherent fading area based on an optimization algorithm through frequency division multiplexing to restore the original signals; and a process of avoiding the coherent fading area based on the optimization algorithm through frequency division multiplexing to restore the original signals comprises:

when a monophonic vibration signal is applied to the to-be-detected fiber under an external disturbance, demodulating the original signals at a computer side and then comparing demodulation results of the first and second groups of intermediate frequency signals with the same spatial resolution to obtain a distortion of two demodulated original signals in different positions caused by a coherent fading; and during a restoration, actively avoiding positions with the distortion to restore the original signals and suppress coherent fading noise.

2. The self-heterodyne φ-OTDR system with the free multi-spatial resolution according to claim 1, wherein in the φ-OTDR system, one spatial resolution in two groups of different spatial resolutions is selected as an optimal resolution for a detection according to an event length of the monophonic vibration signal, wherein in a comparison with an affected length of the external disturbance on the to-be-detected fiber, when the selected spatial resolution is equal to an affected length of a to-be-detected event, a signal-to-noise ratio (SNR) of the φ-OTDR system is optimal.

3. The self-heterodyne φ-OTDR system with the free multi-spatial resolution according to claim 1, wherein the photodetector employs a PIN+EDFA structure.

4. The self-heterodyne φ-OTDR system with the free multi-spatial resolution according to claim 1, wherein the data acquisition card is synchronously controlled by a pulse signal of the pulse signal generator.

5. A method of using the self-heterodyne φ-OTDR system with the free multi-spatial resolution according to claim 1, wherein the method comprises:

S1. driving the narrow linewidth laser source to output a continuous laser signal with a high coherence characteristic at a constant power and injecting the continuous laser signal into a subsequent fiber through the isolator;

S2. dividing the continuous laser signal into the three paths of optical signals with equal powers by using the 1×3 fiber-optic coupler;

S3. driving the driver module to synchronously control the three AOMs by using the pulse signal generator to modulate the three paths of optical signals into three paths of pulse light with different frequency shifts;

S4. enabling the three paths of pulse light to pass through the time-delay fibers with different lengths to introduce different pulse intervals, then coupling the three paths of pulse light into the EDFA through the 3×1 fiber-optic coupler for amplification to obtain amplified and coupled optical signals, and injecting the amplified and coupled optical signals into the to-be-detected fiber through the circulator;

S5. inducing a part of the amplified and coupled optical signals comprising vibration information through the circulator, converting the part of the amplified and coupled optical signals into a corresponding electrical signal by using the photodetector, and dividing the corresponding electrical signal into three paths of electrical signals through the electrical amplifier;

S6. performing a filtering processing on the three paths of the electrical signals by using bandwidth filters with different center frequencies, and filtering out a noise signal and a high-frequency signal from the three paths of the electrical signals to obtain three paths of intermediate frequency signals with different frequencies; and S7. sampling the three paths of intermediate frequency signals by using the data acquisition card to obtain original signals, and adjusting the pulse signal generator based on the original signals, wherein the pulse signal generator and the data acquisition card work synchronously.

6. The method according to claim 5, wherein the method further comprises:

applying a to-be-detected vibration event on the to-be-detected fiber and simultaneously demodulating raw data corresponding to the three paths of the intermediate frequency signals, wherein the three paths of the intermediate frequency signals are first to third intermediate frequency signals, the first and second paths of the intermediate frequency signals have a same spatial resolution and the third path of the intermediate frequency signal has a different spatial resolution than the first and second paths of the intermediate frequency signal two groups; and avoiding the coherent fading area based on the first and second paths of the intermediate frequency signals with the same spatial resolution, and selecting one spatial resolution in two groups of different spatial resolutions according to an event length of a vibration signal as an optimal resolution for a detection to restore the original signals.

7. The method according to claim 5, wherein in the φ-OTDR system, one spatial resolution in two groups of different spatial resolutions is selected as an optimal resolution for a detection according to an event length of the monophonic vibration signal, wherein in a comparison with an affected length of the external disturbance on the to-be-detected fiber, when the selected spatial resolution is equal to an affected length of a to-be-detected event, a signal-to-noise ratio (SNR) of the φ-OTDR system is optimal.

8. The method according to claim 5, wherein in the φ-OTDR system, the photodetector employs a PIN+EDFA structure.

9. The method according to claim 5, wherein in the φ-OTDR system, the data acquisition card is synchronously controlled by a pulse signal of the pulse signal generator.

* * * * *